Nov. 13, 1962  R. R. GRIFFEN  3,063,526
COMBINATION BRAKE AND ACCELERATOR CONTROL
Filed Oct. 5, 1959
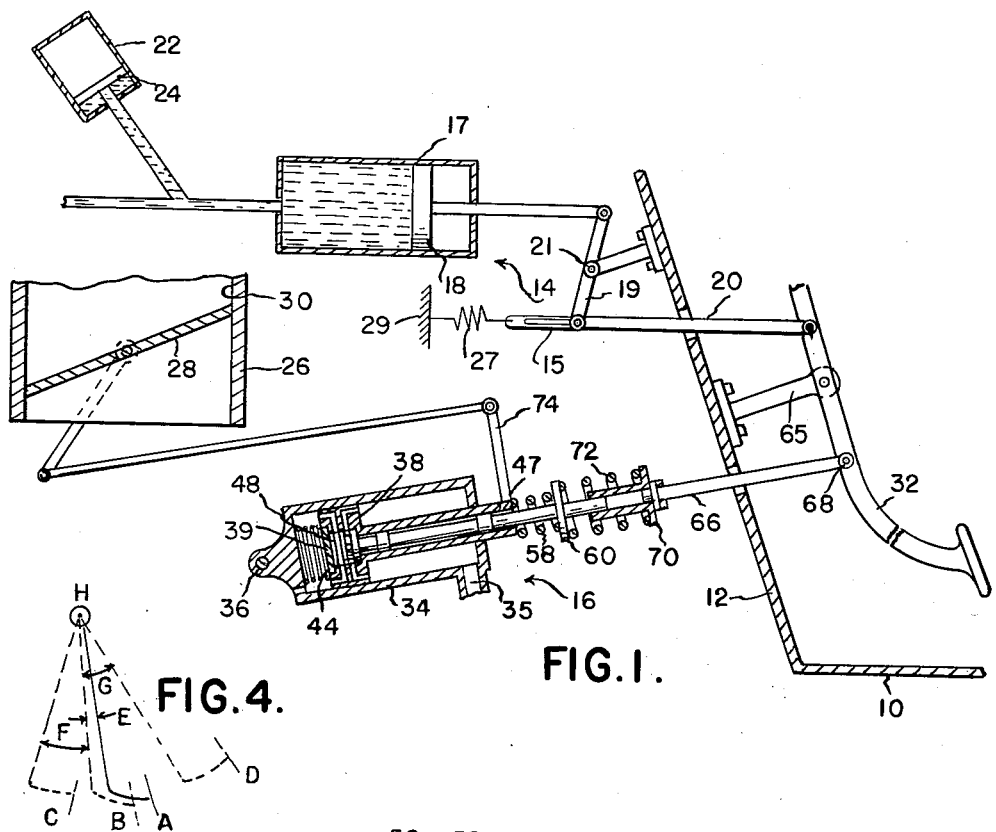
FIG.1.
FIG.4.
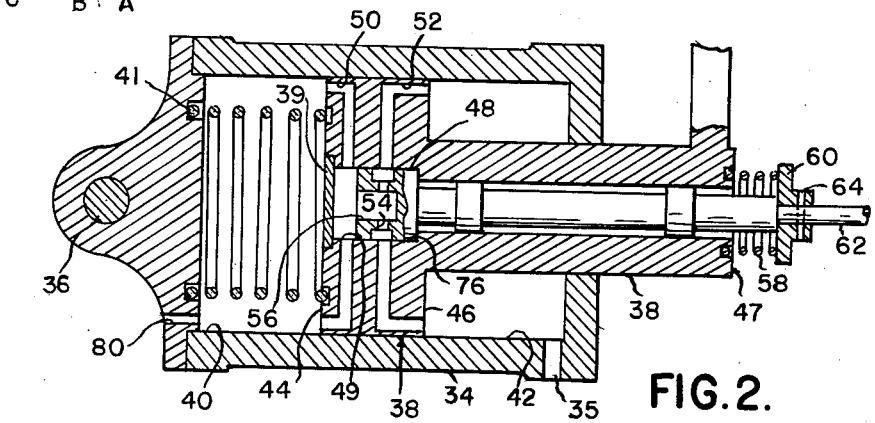
FIG.2.
FIG.3.
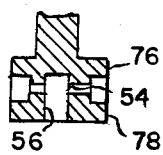
*INVENTOR.*
RALPH R. GRIFFEN
BY
*Whittemore, Hulbert & Belknap*
ATTORNEYS

United States Patent Office

3,063,526
Patented Nov. 13, 1962

3,063,526
COMBINATION BRAKE AND ACCELERATOR
CONTROL
Ralph R. Griffen, Roseville, Mich., assignor to Holley
Carburetor Company, Van Dyke, Mich., a corporation
of Michigan
Filed Oct. 5, 1959, Ser. No. 844,274
8 Claims. (Cl. 192—3)

This invention relates to a brake-accelerator system for a vehicle. More particularly, this invention relates to single actuated means for providing a dual function of controlling both the service brake and the accelerator system of an automotive vehicle.

The prior art discloses that one-pedal systems have been proposed before to control both the service brake and the accelerator. Such systems have required that the foot pedal or lever be depressed for acceleration and be released for braking. When the operator removed his foot from the pedal the vehicle would come to a stop. The stopping force and distance in such a system is a function of the distance the foot is raised from the pedal and the rapidity with which this operation is carried out. The proposed invention overcomes this dangerous characteristic of the prior systems in that removal of the operator's foot from the pedal will not cause a sudden stop of the vehicle but will permit the vehicle to simply drift towards an idling position.

The prior systems have also caused a considerable amount of confusion as to their operation which could result in accidents. If a vehicle operator was accustomed to the conventional method of applying the vehicle brakes and was called upon to overcome an emergency situation whereby it was necessary to quickly apply the brake, the natural tendency of any operator would be to depress the pedal in the conventional manner instead of releasing the pedal as required by the single pedal brake and accelerator control systems of the prior art. If the operator depressed the pedal instead of braking the vehicle he would find himself rapidly accelerating. This created a dangerous situation. The public therefore has not accepted the prior art systems. The safety of passengers, pedestrians, and other vehicles depends upon the design and condition of brake equipment. Brakes must at all times and under varying conditions be capable of stopping the vehicle quickly to avoid collision or loss of control. The proposed invention has an advantage which lies in its reduction of stopping time and therefore stopping distance over the conventional pedal systems as presently employed.

The proposed invention operates in a reverse manner to the prior art combination systems. The operator is still required to depress the lever or pedal in order to create the requisite force to apply the vehicle brakes. On the other hand, instead of depressing the pedal to actuate the accelerator mechanism, the foot pedal is controlled by raising the pedal, or in other words, releasing the force tending to raise the pedal.

If the operator for any reason should remove his foot from the pedal, a control cylinder responds accordingly and the pedal automatically returns to the normal idle carburetor position.

It is an object of this invention to provide a single lever brake and accelerator control system.

Another object of this invention is to provide a single pedal service brake and accelerator system for an automotive vehicle.

A further object of the invention is to provide a combination brake and accelerator control system actuated by a single lever wherein the stopping time and distance is reduced over one-pedal systems.

A still further object of this invention is to provide a single lever brake and accelerator control which places emphasis on the safety requirements and factors involved in the operation of a vehicle.

Another object is to provide a dual brake and accelerator system which is improved, economical, reliable and flexible so as to be incorporated in present existing vehicles.

A further object is to provide an accelerator-brake control system wherein braking is provided by depressing the pedal and acceleration is controlled by permitting the pedal to raise from brake-off position, and in which the pedal returns to brake-off, throttle closed position whenever the operator's foot is removed from the pedal.

Still another object is to provide an improved accelerator control.

Other objects and features of the invention will become apparent as the description proceeds, especially when taken in conjunction with the accompanying drawing, illustrating a preferred embodiment of the invention, wherein:

FIGURE 1 is a schematic diagram showing a single pedal service brake-accelerator system.

FIGURE 2 is an enlarged view of the vacuum control cylinder and piston incorporated in the system.

FIGURE 3 is a partial sectional view of the shift piston shown in FIGURE 2.

FIGURE 4 is a diagrammatic view showing the various pedal positions and ranges.

Referring to FIGURE 1, the conventional floor of an automobile represented by the numeral 10, has an upwardly extending fire wall 12 which separates the inside of the vehicle from the engine compartment. On the engine side of the wall 12 is employed a service braking system represented by numeral 14 and an accelerator control system represented by the numeral 16. Both of the systems are schematically represented in the drawing.

The braking mechanism 14 is the conventional type of service brake which is applied by pressure from the operator's foot. It is within the contemplation of this invention that the various methods of mechanical application of brakes may be used or that a hydraulic brake system may also be used, as is shown in FIGURE 1. Since the mechanical as well as the hydraulic braking systems have limitations as to sizes of cylinders, etc., the amount of braking force applicable is limited. These factors restrict the brake shoe to brake drum pressures obtainable. Therefore, a vehicle may incorporate power brakes to increase the braking force available. Such power brake systems may utilize air brakes which employ compressed air to actuate the braking mechanism; a vacuum system which utilizes the vacuum created in the intake manifold of the vehicle engine; or the electric brake which uses electrical energy stored in a battery.

The braking system 14 has a master cylinder 17 having a piston and rod 18 reciprocating in the master cylinder 17 under the control of the brake control rod or linkage 20. The linkage 20 includes a lost motion slot 15. A lever 19 pivoted at 21 connects the piston and rod 18 with the control rod 20. A wheel cylinder 22 having a piston 24 movable therein is conventionally represented to be of the type which connects to the brake shoes (not shown). In this type of a system, the movement of the brake shoes against the drum is accomplished by the pistons which are connected directly to the shoes. By varying the size of the cylinders associated with each of the wheels in relation to the size of the master cylinder 17, it is possible to distribute the desired available pressure throughout the system. When force is applied to the brake control rod 20 the piston 18 moves in a direction to assert a pressure which is transmitted equally in all directions to the wheel cylinders 22.

A carburetor 26 is of the conventional type and is mounted normally on the engine of the vehicle. A throttle valve 28 is positioned in the mixing chamber 30 so as to regulate the amount of fuel flow from the carburetor 26 to the engine. FIGURE 1 shows the throttle valve in the normal idle position. The lost motion slot 15 in the linkage 20 permits closure of the throttle valve 28 before any braking force is applied. A spring 27 is connected on one end to the brake control rod or linkage 20 and on the other end to a fixed abutment 29. Spring 27 is a schematic representation of the return springs which exist in the conventional braking system. The throttle valve 28 is controlled by the accelerator mechanism 16 in response to the operator's control of the pedal or lever 32 which is connected to both the brake mechanism 14 and to the accelerator mechanism 16. A vacuum control cylinder 34 is connected at 36 to the frame (not shown) of the vehicle. The cylinder 34 may be connected at 35 to any vacuum source, such as the intake manifold of the vehicle engine. A piston 38 reciprocates within the cylinder 34 and divides the cylinder into a pair of pressure chambers 40 and 42. A spring 41 which is optional is provided in chamber 40 for biasing the piston 38 in a direction to close the throttle valve 28 through means of the throttle linkage which will be subsequently described. The first and largest area of the piston 38 which includes the welch plug 39 is represented by the numeral 44 and the second and intermediate area is represented by the numeral 46. The third area of piston 38 is represented by numeral 47. The size of the various piston areas may be selected and designed to obtain the proper forces necessary for operating the acceleration mechanism 16. A servo piston or shift piston 48 is provided in the hollow portion 49 of the piston 38. First passage means 50 and 52 are provided in the differential piston 38. Second passage means 54 and 56 are provided in the shift piston 48. A very light spring 58 biases the shift piston 48 with reference to the differential piston 38 in a direction to connect the first and second passage means 50, 52, 54 and 56 to permit vacuum fluid to communicate between the chambers 40 and 42 when the caruburetor is in an idle position as shown in FIGURE 1. The shift piston 48 has a spring retainer 60 against which the spring 58 abuts. A shift piston rod 62 is secured to the shift piston retainer 60 by a pin connection 64.

An accelerator control rod 66 is connected to the lever 32 on one end thereof at 68 and is connected on the other end to the shift piston 48 by an overtraveling arrangement which includes a sleeve 70 and an override spring 72 which is larger than the light spring 58. A throttle linkage 74 connects the differential piston 38 to the throttle valve 28.

In FIGURE 1 the carburetor is in an idle position. The pedal 32 may be considered to be in a neutral position without any force applied to the pedal 32 by the vehicle operator. When depressing the lever 32 so as to apply the brake mechanism 14, the control rod 20 is moved towards the operator. The linkage 19 pivots at 21 and forces the piston and rod 18 into the cylinder 17 so as to displace fluid from the master cylinder 17 and apply pressure to the wheel cylinder 22. During this operation the lever 32 which pivots on the support bracket 65 moves the accelerator control rod 66 inwardly, initially depressing the control spring 58 and in turn moving the shift piston 48 to a position to close the passages 52 and 50 with the piston lands 76 and 78 respectively. The override spring 72 is then depressed and permits the control rod 66 to move relative to the control piston 38 and the shift piston 48.

The operation of the entire system will be discussed from the following positions: 1. Brake off—engine off; 2. Brake off—engine idle; 3. Brake off—throttle slightly open; 4. Brake off—throttle wide open; 5. Brake on—engine idle; and 6. Brake on—engine off.

In referring to FIGURE 4, it suffices to say at this time that the solid line lever identified by letter "A" is shown in a position to represent the brake off and the engine either at an off position or at an idle position. The shift piston 48, as shown in FIGURES 1 and 2, connects the passages in the main control piston 38 with chambers 42 and 40 so as to permit vacuum from chamber 42 to also act in chamber 40. The atmosphere acting on area 47 creates a force to move the throttle valve 28 to an idle position. The angle subtended by the lever when in the idle position "A" and moving to position "B" is represented by the letter "E." This is the initial travel which takes place when a slight force is applied to the lever 32 so as to move the lever in a downward direction away from the operator to compress the control spring 58.

When the spring 58 is compressed the shift piston or servo valve 48 moves to a lower position to prevent fluid communication between chambers 40 and 42. Since the vacuum is no longer connected to chamber 40, atmospheric pressure is exposed to the chamber 40 through restricted vent means 80 so as to act on the piston area 44 and tend to move piston 38 in an upward direction. As long as control spring 58 is compressed this condition will exist so that there is a force applied to the piston 38 which tends to "push up" on the operator's foot.

As the lever 32 is moved from position "B" to the full braking position represented by position "C," an angle "F" is subtended. This angle represents the maximum angle which must be subtended in order to fully apply the brake mechanism. The greater the force applied to the master cylinder 17, the greater is the force transmitted by the cylinder equally in all directions to the wheel cylinders.

In order to permit the brake control rod 20 to move so as to apply the brake mechanism 14, it is necessary to provide an over-travel arrangement which permits the acceleration control rod 66 to move when the braking mechanism 14 is being applied. This movement of the acceleration control rod 66 will not disturb the throttle valve 28. The over-travel means consist of a sleeve 70 and the override spring 72 which is larger than the control spring 58. After the control spring 58 has been depressed a continued downward force in the braking direction will compress the override spring 72 and permit the accelerator control rod 66 to move without disturbing the acceleration control cylinder 34. When the brakes have been applied the engine may be in an off or in an idle position.

When the operator releases the brake mechanism and starts to accelerate, he removes the foot pressure required for braking so as to permit the lever in braking position "C" to move toward him and toward position "B." This is due to the atmospheric pressure acting on area 44 and tending to move the piston 38 in a direction to open the throttle valve 28. During this interval, the energy stored in spring 72 is released and returns the spring 72 to its normal position. The control spring 58 remains in a compressed position due to the slight force applied to the lever by the operator such that the force on the main control piston 38 is constantly exerting an upward force on the foot of the operator. As long as the spring 58 remains compressed, the lever 32, when having attained position "B," will move towards a position "D" which would represent the throttle 28 in a wide open position. When the lever 32 has moved towards the operator, the spring 58 remaining compressed, the throttle starts to open. It will be observed that this function takes place only after the brakes have been released and the control spring 72 has returned to its normal position. When the lever 32 moves in an upward direction from position "B" to position "D," the piston 38 moves the throttle from a slightly open position to a wide open position. The amount the throttle is opened depends upon the force exerted by the operator on the lever 32, so long as the compression spring 58 remains in a compressed position. The operation describes the situation where the brake is off and the throttle is moving from a closed to a wide open position.

Once the operator has removed the force from the lever 32 necessary to compress the spring 58, the spring 58 will return the secondary piston 48 to a position as shown in FIGURES 1 and 2 to permit vacuum to travel to both sides of the cylinder 34. The atmosphere acting on the outer area 47 of piston 38 is sufficient to move the piston 38 in a leftward direction as viewed in FIGURE 1 to close the throttle valve 28. The engine has been returned to the idle position which is represented in FIGURE 4 as position "A."

I have disclosed an acceleration-brake system which provides adequate "feel" for acceleration and for braking purposes. By selectively choosing different spring rates, various design features may be met so as to provide a system which will meet safety codes. This system is not only safer than the prior art systems but is also economical, reliable, and flexible so as to be incorporated in new or used vehicles.

The drawing and the foregoing specification constitute a description of the improved combination brake and accelerator control in such full, clear, concise and exact terms as to enable any person skilled in the art to practice the invention, the scope of which is indicated by the appended claims.

What I claim as my invention is:

1. An accelerator control mechanism for an internal combustion engine having a throttle and a source of vacuum comprising a cylinder closed on both ends, a hollow piston in said cylinder, a tubular stem connected at one end to one side of said piston and projecting through an end wall of said cylinder to expose the other end thereof to the atmosphere, said stem being spaced from the side walls of said cylinder to define a first chamber in said cylinder at one end thereof, a second chamber in said cylinder at the other end thereof opposite the other side of said piston, passages in said piston between said chambers and the interior of said piston, passage means connecting said first chamber to the source of vacuum, restricted passage means connecting said second chamber to the atmosphere, a valve movably received in the interior of said piston and controlling vacuum communication between said chambers, a rod movable longitudinally in said stem and connected at one end to said valve, an abutment on said rod, linkage means connecting said stem to the throttle to control the position thereof, resilient means provided between said abutment and said other end of said stem for biasing said rod in one direction away from the other end of the cylinder to provide communication between said chambers, whereby the atmospheric pressure acting on said other end of the stem is effective to move said stem towards said other end of the cylinder to urge said throttle in a closing direction through said linkage means, and an actuating mechanism operatively connected to said rod and effective upon the application of a predetermined force thereto to move said rod towards said other end of the cylinder and thereby compress said resilient means and move said valve member to a position to block communication between said chambers through said passages, whereby the atmospheric pressure acting in said second chamber is effective, while said resilient means remains compressed due to the force on said actuating mechanism, to move said piston and said stem in said one direction to urge said throttle in an opening direction through said linkage means.

2. An accelerator control mechanism defined in claim 1 wherein said resilient means is in the form of a spring.

3. An accelerator control mechanism defined in claim 1 wherein a spring is provided in said second chamber for biasing said piston and said stem in said one direction.

4. An accelerator control mechanism defined in claim 1 wherein said actuating mechanism is in the form of a pivotally mounted, foot operated pedal.

5. An accelerator control mechanism defined in claim 1 wherein the source of vacuum is manifold vacuum.

6. An accelerator control mechanism defined in claim 1 wherein a passage is provided in said valve which is connected to the passages in said piston to provide communication between said chambers when said resilient means biases said rod in said one direction.

7. An accelerator control mechanism defined in claim 1 wherein said stem is integral with said piston.

8. An accelerator control mechanism defined in claim 1 wherein said rod is integral with said valve.

References Cited in the file of this patent

UNITED STATES PATENTS

| | | |
|---|---|---|
| 2,164,921 | Hoff | July 4, 1939 |
| 2,338,244 | Hayes | Jan. 4, 1944 |
| 2,491,551 | Cross | Dec. 20, 1949 |
| 2,596,998 | Van Hilson | May 20, 1952 |
| 2,639,721 | Strief | May 26, 1953 |
| 2,644,427 | Sedgfield et al. | July 7, 1953 |
| 2,781,116 | Watson | Feb. 12, 1957 |
| 2,845,815 | Koehler et al. | Aug. 5, 1958 |
| 2,868,035 | Mudon | Jan. 13, 1959 |
| 2,909,157 | Reis | Oct. 20, 1959 |
| 2,920,727 | Rabin | Jan. 12, 1960 |